United States Patent [19]

Giraudy

[11] Patent Number: 5,357,255
[45] Date of Patent: Oct. 18, 1994

[54] SYSTEM FOR THE REMOTE DISPLAY OF OUTPUT DATA OF AT LEAST ONE RADAR

[75] Inventor: Bernard C. Giraudy, Taverny, France

[73] Assignee: Sopelem-Sofretec, Bezons, France

[21] Appl. No.: 50,885

[22] Filed: Apr. 21, 1993

[30] Foreign Application Priority Data

Jun. 18, 1992 [FR] France ................................ 92 07421

[51] Int. Cl.$^5$ ............................................... G01S 7/04
[52] U.S. Cl. ...................................... 342/58; 342/185; 342/55; 342/176; 342/197
[58] Field of Search ................... 342/58, 176, 185, 55, 342/197

[56] References Cited

U.S. PATENT DOCUMENTS

| | | | |
|---|---|---|---|
| 3,201,787 | 8/1965 | Grewe et al. | 342/58 |
| 3,870,992 | 3/1975 | Hanna, Jr. | 342/58 |
| 4,439,765 | 3/1984 | Wilmot | 342/58 |
| 4,580,164 | 4/1986 | Andrieu et al. | 358/140 |
| 4,660,043 | 4/1987 | Lachaize et al. | 342/185 |
| 4,754,279 | 6/1988 | Cribbs | 342/185 |
| 5,073,779 | 12/1991 | Skogmo et al. | 342/37 |
| 5,097,268 | 3/1992 | Bauer, Jr. et al. | 342/160 |

*Primary Examiner*—John B. Sotomayor
*Attorney, Agent, or Firm*—Martin Smolowitz

[57] ABSTRACT

This system for displaying data on a display unit comprising a television screen associated with a videographic memory, the data containing at least one videographic signal and scanning data, a pre-processing unit for reel time programming the output data of the radar, a threshold unit for thresholding the videographic signal from its background noise, and a digitizer circuit for digitizing the videographic signal after thresholding, a compression circuit for space-time compressing the videographic signal after digitization, a transmission device for proprietary serial data transmission of the scanning data, of the compressed videographic signal and of compression data, to the television display assembly unit, which comprises a decompression unit for decompressing the videographic signal and a converter unit for converting the standard of the coordinates of the data contained in this signal, from a polar coordinates into a Cartesian coordinates with the aid of the compression and scanning data, and control device for controlling the contents of the memory in cooperation with an after glow processor, for controlling certain zones of videographic memory according to a mathematical treatment formula, and generating a complete image of the radar output.

9 Claims, 6 Drawing Sheets

SYSTEM FOR THE REMOTE DISPLAY OF OUTPUT DATA OF AT LEAST ONE RADAR

BACKGROUND OF THE INVENTION

The present invention relates to a system for the remote display of output data of at least one radar.

More particularly, this system is adapted to permit the display of output data of a radar on a display unit comprising a television screen associated with a videographic memory.

Systems exist in the art for displaying output data of a radar in which the different outputs of a radar are applied to a display console comprising a conventional readout.

More particularly, the videographic signal output of this radar is connected to the corresponding input of the readout via a coaxial cable or H.F. microwave.

It will be understood that the use of such a cable presents a number of drawbacks as concerns the placement of the different components of the radar unit, the transmission of the signals and ease of the use of the radar unit.

SUMMARY OF THE INVENTION

Therefore it is object of the invention to overcome these problems by providing a system for remote display of a radar output data in a dimple and reliable manner to avoid the various problems related to the use of a coaxial cable.

Therefore, the invention provides a system for the remote display of output data of a radar on a television display assembly unit of a television screen associated with a videographic memory, the data contains at least one videographic signal and scanning data, the system comprises an analog pre-processing unit for processing the different output data of the radar, a thresholding device for cleaning unwanted data from the videographic signal, a digitizing device for digitizing the videographic signal after thresholding, a compression device for effecting a space-time compression of the videographic signal after digitization, a device for transmitting in a proprietary serial data format, the scanning data, the compressed videographic signal and the compression data, to the television display assembly unit, the display unit further comprising a decompression device for decompressing the videographic signal and a conversion device for converting the standard of the coordinates of the data contained in the videographic signal from polar coordinates into a Cartesian coordinates with the aid of the compression and scanning data, and a control device for controlling the contents of the videographic memory as a function of the videographic signal and the scanning data.

It is advantageous according to the invention, that the scanning comprises data synchronization data passing through North and the useful range of the radar beam.

It is also advantageously that the data relating to the space-time compression comprise space and time merging parameters.

A better understanding of the invention will be had from the following description which is given solely by way of example with reference to the accompanying drawings.

DESCRIPTION OF THE PREFERRED EMBODIMENT

Figure 1:
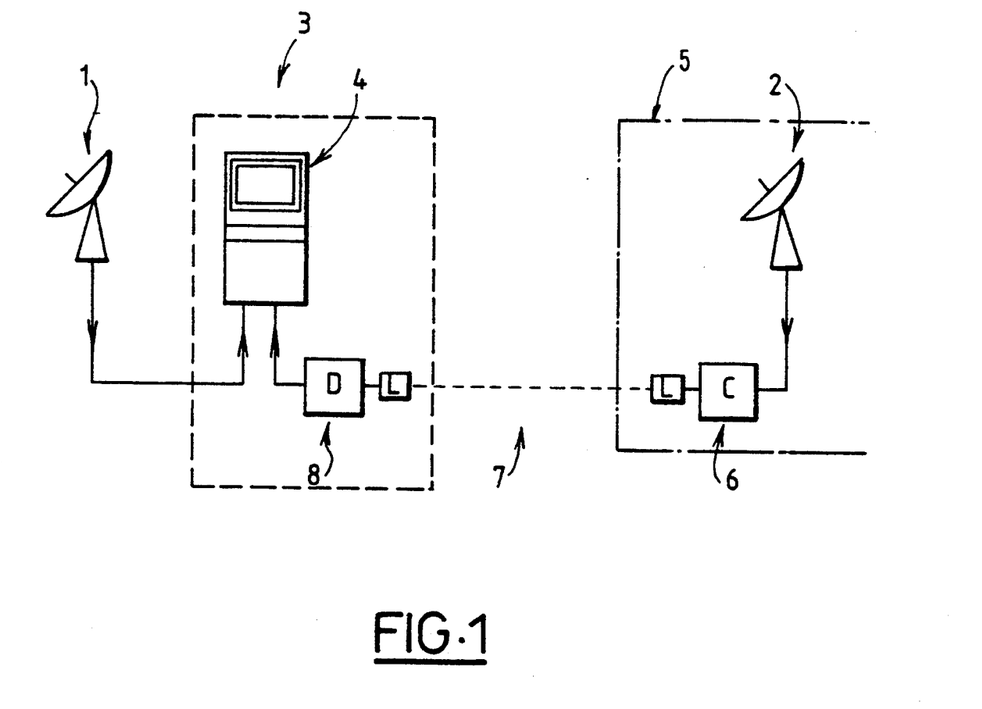
FIG. 1 represents first example of the layout of a remote display system according to the invention.
Figure 2:
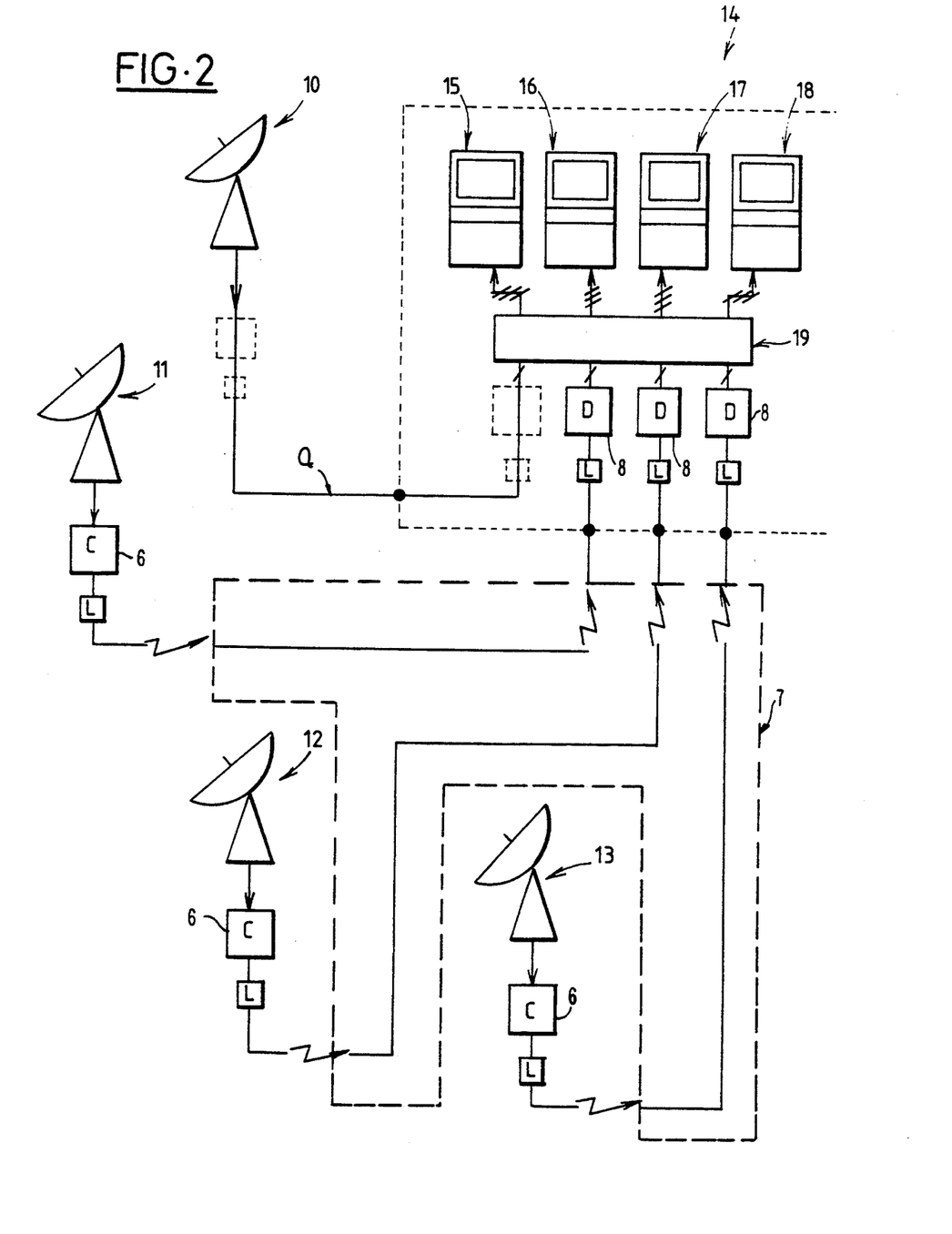
FIG. 2 represents a second example of the layout of a remote display system according to the invention.

As can be seen in FIGS. 1 and 2, a system according to the invention, permits remote display of the output data of a radar on a display unit.

In the embodiment shown in FIG. 1, a first radar 1 is connected via a coaxial cable to a television display assembly unit 3, while a second radar 2 is connected to the same television display assembly unit 3 via special connecting means which will be described in more detail hereinafter. The television display assembly unit 3 comprises a television screen 4 associated in the known manner with a videographic memory.

The different output data of a radar comprise in the known manner at least one videographic signal and the scanning data of the radar.

The radar display interface system 5 according to the invention is used in the embodiment illustrated in FIG. 1 for connecting the radar 2 to display unit 3.

This display system 5 comprises a processing device 6 connected to the output of the radar 2 located at a distance from the television display assembly unit 3, the processing device 6 is connected to a transmission device 7 which will be described in more detail hereinafter and insure connection between the remote radar 2 and transmission receiver device 8 associated with the television display assembly unit 3.

As shown in FIG. 2, a plurality of radars, for example four, designated by 10, 11, 12 and 13, may be connected to a television display assembly unit 14 in a manner similar to that shown in FIG. 1, so that it is possible to group for example, at one place different display units associated with different radars.

These different display units, 15, 16, 17 and 18, are then connected to the output of a distribution device 19, the input of which receives the different data coming from the different radars 10, 11, 12, 13 via the transmission device for this data.

The connection between the radar 10 and the television display 15 is provided by a coaxial cable a in the embodiment illustrated in FIG. 2, whereas the other radars are connected to this television display assembly 14 by special connecting devices similar to those which connect the radar 2 to the television display assembly unit 3 shown in FIG. 1.

Figure 3:
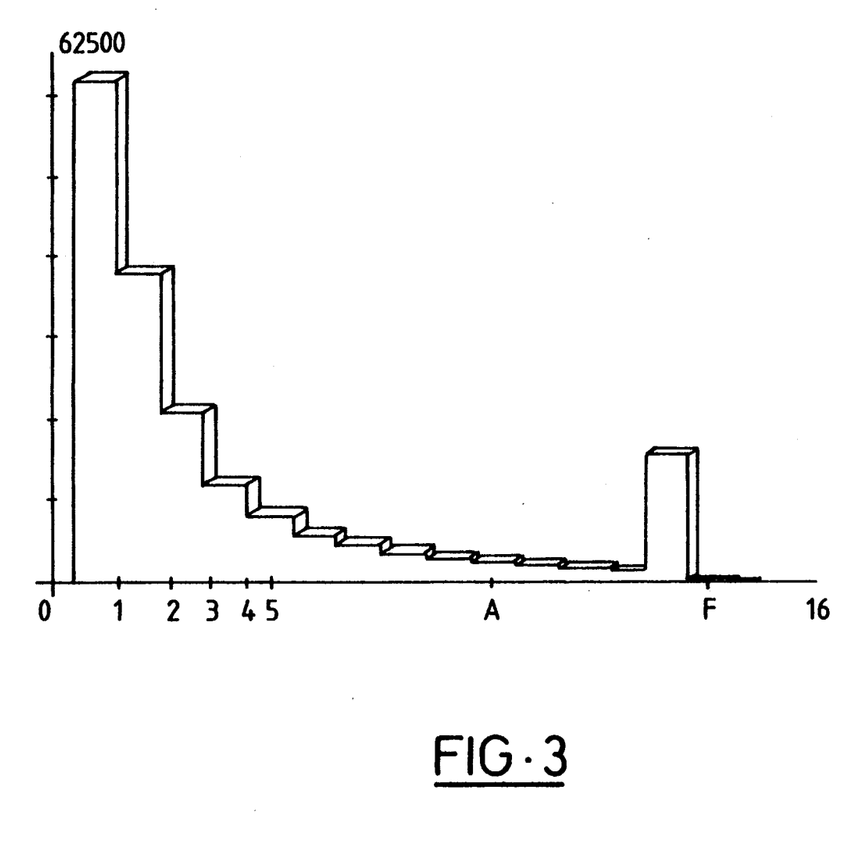
FIG. 3 illustrates a statistical study of the different videographic levels present in the course of a radar scanning.

These connecting devices comprise transmission device 7 which are in fact based on the use of a proprietary serial data format transmission. A statistical study of the videographic levels present in the course of a radar scanning provides the following different observations as shown in (FIG. 3).

Of the effective $30 \times 10^6$ samples of a radar image, $27 \times 10^6$ pertain to 0 level and are consequently devoid of data, The background noise is relatively high (intermediate levels) and can therefore be partly eliminated by a simple threshold.

After thresholding the noise, only about 50,000 samples remain which represent the data useful for the physiological understanding of the radar image, namely on average 100 bits per radius of this image.

It will therefore be understood that, by means of an adapted tagging of the different samples along a radar radius, and by means of a simple thresholding, it is possible to transmit the radar videographic data via a transmission channel having a throughput on the order of 128 Kbits, in fact, the data throughput may be made to vary from 64 Kbits/s to 2 Mbits/s.

These different observations show that it is possible to achieve the transmission of the different useful output data of a radar over a simple wire transmission channel or by employing narrow-band H.F. microwave transmission and receiving device of a conventional type.

It is indeed of relative interest to be in a position to employ for example, wire connections such as telephone connections of known type, for connecting one or more radars to one or more display units, this connection avoiding all the problems relating to distance in an extremely simple manner.

However, in order to reproduce an image which is as close as possible to the original radar image, it is possible to eliminate only a minimum number of the samples constituting the background noise, which improves the comprehension of this image.

It is therefore necessary to employ a data compression technique. The rate of compression to be reached once the different zeros of the radar image are eliminated, is modest so that a simple space-time compression may be employed.

This space-time compression consists in merging N samples on M radar radii and replacing the $M \times N$ samples by the maximum value of the videographic signal in this zone.

The choice of the different coefficients M and N of the space and time merging is a function of the available rate of transmission in the channel.

Thus, the higher the rate of transmission, the closer are the coefficients M and N to one and the closer is the reconstructed videographic image to the original radar videographic image.

Note that with this principle, no data is lost, since only the geometry of an echo may be modified, it being possible to reconstruct an illuminated sample in $M \times N$ samples of the same intensity.

Figure 4:
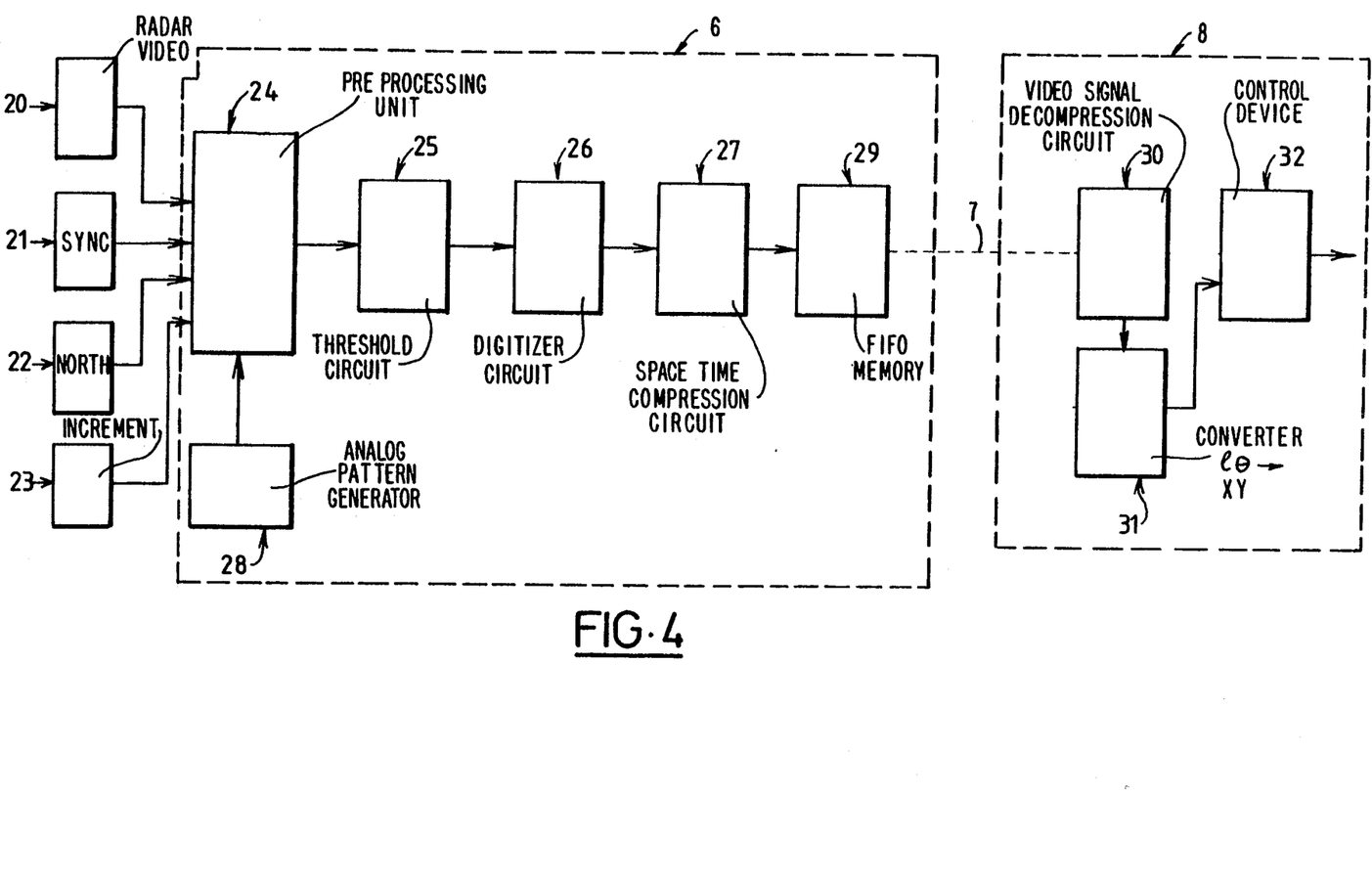
FIG. 4 is a block diagram illustrating the operation of a display system according to the invention.

FIG. 4 represents a block diagram illustrating the operation of a display system according to the invention. It can be seen that the different output data of a radar, i.e. the radar videographic signal 20, the synchronization signal 21, the pulse signal of passing through North 22 and the increment signal 23, are connected to pre-processing unit 24 for pre-processing these different output data.

Thus, for example, the videographic signal passes through an amplification circuit which is integrated in pre-processing unit 24 so as to present a correct amplitude for the rest of the circuits of the system.

Furthermore a threshold circuit 25 is also provided for thresholding the videographic signal. This thresholding circuit 25 permits the elimination of the different image samples devoid of data and at least a part of the background noise.

It is to be noted that this thresholding circuit may be adjusted manually or automatically.

The system represented in FIG. 4 further comprises digitizer circuit 26 for digitizing thresholding videographic signal after the and a space-time compression circuit 27 compressing the videographic signal after digitization.

The compression circuit 27 comprises for example, a merging device for merging the results of the digitization of videographic signal.

In fact, this system is based on the use of cards of the short Simple Europe type which accept at the input, the outputs of most of the radars delivering the North pulse increment data and ensure the processing of the different signals, the adaptive or manual thresholding of the radar videographic signal, the digitization of the radar videographic signal, the sub-sampling for example at 10 MHz of the result of the digitization, as well as the generation of an analog test pattern by analog pattern generator 28, for checking the system.

Further, the rest of the components of these cards ensure the generation of clocks as a function of the different space-time compression parameters M and N, the formatting of the data to be transmitted and the merging of the videographic data in the $M \times N$ zone, in accordance with:
the maximum value in the zone,
the minimum value in the zone, and
the mean value inside the zone.

When these different operations have been carried out, the resulting signals are entered in a FIFO memory 29 of the first input, first output; this memory being part of the transmission device 7 as shown in FIGS. 1 and 2 for transmitting this data to the television display assembly unit.

These transmission devices 7 then ensure proprietary serial format transmission of the different scanning data, the compressed videographic signal in a compressed format, to this display unit. The television display assembly unit comprises a video signal decompression circuit 30 for decompressing the videographic signal achieving the transformations opposite of those brought about by the previously-described space-time compression circuit 27, and a polar to cartesian converter 31 for converting the coordinates of the different data contained in the transmitted videographic signal.

Indeed, the data contained in the output videographic signal of a radar are in polar coordinates and in order to ensure the correct display of this data on a television screen, it is desirable to convert the standard of the coordinates of this data from the polar coordinates into a Cartesian coordinates.

It will be understood that these different decompression and conversion operations are carried out with the aid of different transmitted compression and scanning data.

The conversion of the standard permits direct writing of the different samples in the physical space of the videographic memory associated with the screen. It will be noted that these different operations are conventional and carried out in real time.

It will be understood that these different coordinates may be modified as a function of different parameters, such as for example the position of the radar with respect for example to the location of the display unit, etc.

Thereafter, these different data are employed by control device 32 controls the contents of the videographic memory 36 associated with the screen as a function of the videographic signal and the scanning data, as will be described in more detail hereinafter. The control device 32 per FIG. 4, further comprises a radar addressing device 39, an after glow processor addressing device 40 and a T.V. reading addressing device 41, connected to a multiplexer 38, all shown in FIG. 5.

As previously mentioned the transmission device 7 transmit the different data in a proprietary serial format and this format may be defined in the following manner.

Several data are to be transmitted so as to reconstitute the time aspect of the radar scanning. The transmitted data may for example be formed by:

the antenna rotation data
* synchronization
* North pulse
the compression ratio M × N
the useful radar range
whence the transmission format

| SS | 1 | RR | 1 | LA | M | TN | N | 1 | RR | 1 | ADR | D | ADR | D |
|---|---|---|---|---|---|---|---|---|---|---|---|---|---|---|
| Syncro | | Radar range | | Format | | | | | Increment | | Data | | | | with:

*Synchro sector SS

| D16 | | | D1 |
|---|---|---|---|
| 1000 | 0000 | 0000 | 0000 |

The presence of this code indicates the start of the transmission of the data relating to a videographic zone M × N.

*Radar range RR

| | D16D15 | | | D2D1 | |
|---|---|---|---|---|---|
| 1 | XXX | XXXX | XXXX | XXX | 1 |

Indicates the length of a radical with
D2 = LSB = 200 ns
*Format

| D16 D13 | D12 D9 | D8 D5 | D4 D1 |
|---|---|---|---|
| LA | M | NP | N |

LA: length of the pixel address in the transmitted data

D13 ⟶ D16

| Numbers of bits | LA |
|---|---|
| 12 | 0 |
| 11 | 1 |
| 10 | 2 |
| 9 | 3 |
| 8 | 4 |
| 7 | 5 |

M: spatial merging parameter (number of radicals) D9 ⟶ D12

NP: North Pulse Code D5 ⟶ D8 a content equal to F in this field indicates passing through North.

N: Time merging parameter (number of samples along the radical).

D1 ⟶ D4

*Increment

| | D16D15 | | | D2D1 | |
|---|---|---|---|---|---|
| 1 | XXX | XXXX | XXXX | XXX | 1 |

Indicates the mean value of the increment of rotation of the antenna with D2 = LSB = 200 ns.
This field is present only when the North Pulse is present.
*Data

| AAAA AAAA AAAA | D D D D |
|---|---|
| Addresses | Data |

-continued

Address: corresponds to the address of the M × N zone along the radius.
This field varies as a function of the LA field.
Data: value of the video of the M × N zone located by the address field on 4 bits (16 levels).

Figure 5:
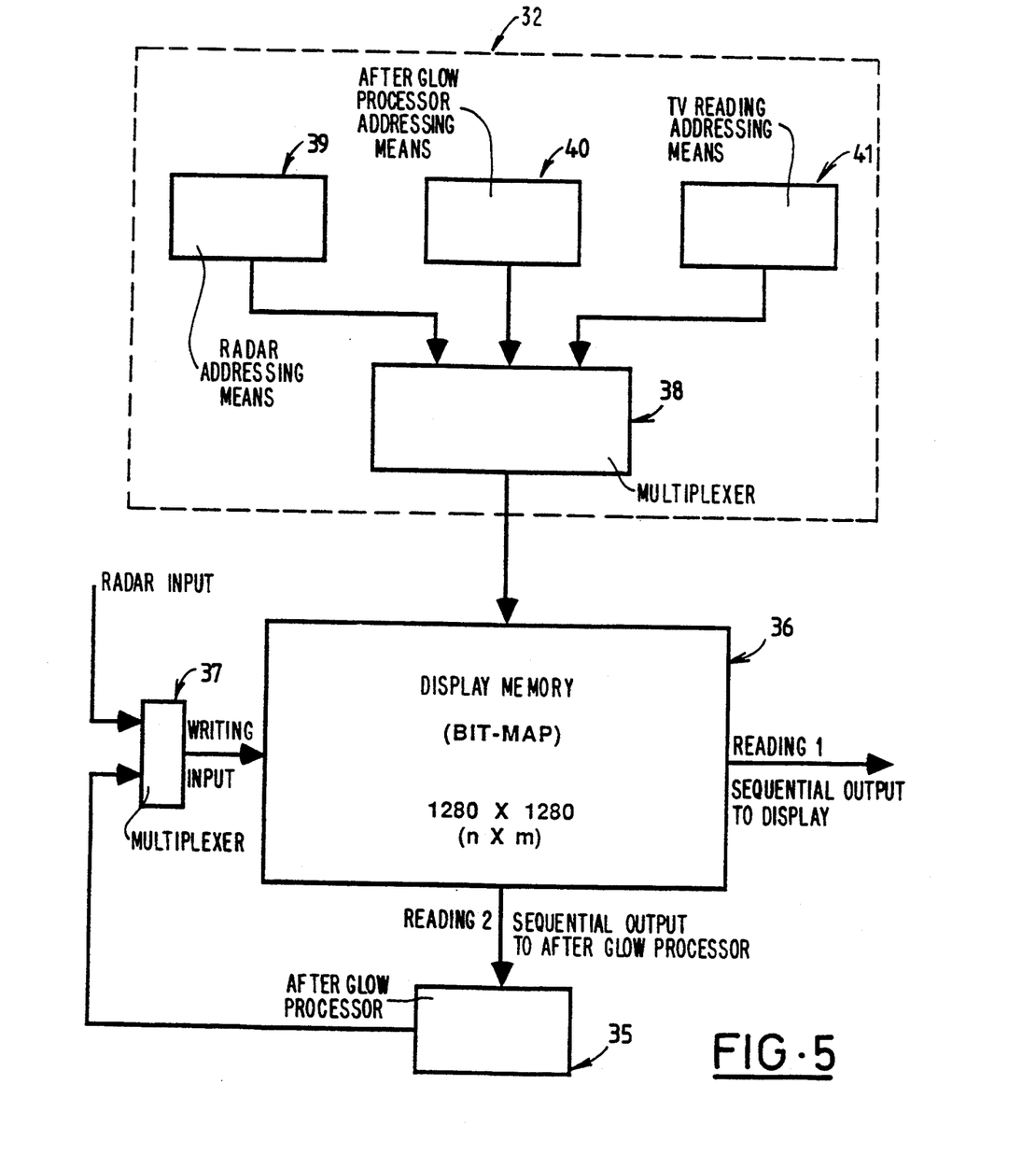
FIG. 5 is a block diagram illustrating the operation of an after glow processor non-integrated into the decompression device which is part of the structure of a display device, according to the invention.

The analysis of these different data then permits the control device 32 to reconstruct a radar image in the videographic memory 36 which is as close as possible to the image delivered by the radar itself (per FIG. 5).

It was previously mentioned, per FIG. 1, the television display assembly unit 3 may comprise at least one television screen 4 associated with a videographic memory 36. In order to improve the display of the radar image on this screen, the control device 32 controls the contents of the videographic memory 36 and functions in conjunction with after glow processor 35 for processing the contents of certain zones of this videographic memory 36 in accordance with a given law, a mathematical treatment formula, such as is known, for example, from U.S. Pat. No. 4,580,164, so as to produce a pseudo-after glow phenomenon of certain points of the radar image displayed on the screen.

Operation of the processor 35 as illustrated in FIG. 5, has been designed to solve the general problem of the presentation of a radar image on a television screen in black and white or colors.

This after glow processor 35 connected to the videographic memory 36 effects the progressive clearing for example, of the contents of certain zones of memory 36 so as to present for each radar revolution the situation in real time and the conventional display of a radar situation closely related to the phosphors after glow phosphors employed in cathode ray tubes of conventional radar consoles. The after glow processor utilizes as a parameter an after glow coefficient of decrement based on a mathematical treatment formula.

The observation of visual phenomena due to the asynchronism of the two types of scanning (radar and TV) and the physiology of the human eye, permits the design of a simple and high-performance processor after glow permitting an excellent rendering of the pseudo-after glow effect.

Access to the videographic memory 36 is achieved in accordance with the following different principles:

in writing, by the radar input through multiplexer device 37, which corresponds to one reading cycle with a rewriting in the memory 36 of the old value contained in the memory, if the latter is greater than the amplitude of the radar data, while in the opposite case, the radar data is written in the memory 36, in writing, by the after glow processor 35 through the multiplexer device 37, which corresponds to one cycle of reading and rewriting of the stored data with for example decreasing achieved in accordance with a law, a mathematical treatment formula programmable by linear or exponential functions, in reading, by the TV output, which corresponds to one cycle of the sequential reading of the stored data for the presentation of the image on the screen.

The memory 36 is of course controlled in a conventional manner by the control device 32 comprising multiplexer 38, radar addressing means 39, after glow processor addressing means 40 and TV reading addressing means 41.

It will therefore be understood (see FIGS. 4 and 5) that this system permits displaying on a standard television screen having an X, Y scanning, i.e. in Cartesian coordinates, the images issuing from a sensor operating in $\rho$, $\theta$, i.e. in polar coordinates.

The sensor is in this case a radar antenna and associated electronic controls and the system, permits a display of the radar image which respects the ergonomics of conventional consoles of the PPI (Plan Position Indicator) type while conserving the quality of the image related to the phosphors after glow employed and the remanence processor, associated with a standard $\rho$, $\theta$/X,Y converter, permits generating a luminous pseudo-after glow phenomenon respecting the visual access of the laws of energy decrease of these phosphors.

Of course, this after glow processor 35 may be constructed with the aid of discrete components or in the programmed form and the after glow may be adjustable, for example from 3 seconds to infinity, which permits for example, a trace history of the trajectories allowing one or more moving targets to be monitored.

Each television display assembly unit may also receive data from a plurality of radars located at a distance from one another.

The simultaneous display of these data is then achieved as a function of the place of each one thereof, by using for example, different colors.

It will therefore be understood that, by the use of specialized algorithms of compression of the signal, it is possible to convert the radar data, namely the videographic signal and the scanning data, into a digital proprietary serial format data which is easily transmissible over very long distances.

It is to be noted that the compression algorithms come directly from those employed in the processing of the image.

This compression permits for example: transmission of the data on a radar site, through twisted wires and no longer through a coaxial cable or H.F. microwaves, transmission of data between two distant points, through an adapted channel using H.F. microwaves or a conventional wire connection.

When using a conventional wire connection, a plurality of lines may be used, as for example, those of specialized telephone networks.

The transmission distances may be of any magnitude and, at the reception, the data may be displayed with a delay on the order of a second, relative to the time for sending the data over the line.

The display unit may include high-definition screens, which results in an excellent quality of the reproduction of the images.

The invention also permits the simultaneous display of a plurality of complete or partial radar images on the same monitor, the radars being located at a distance from one another.

Figure 6:
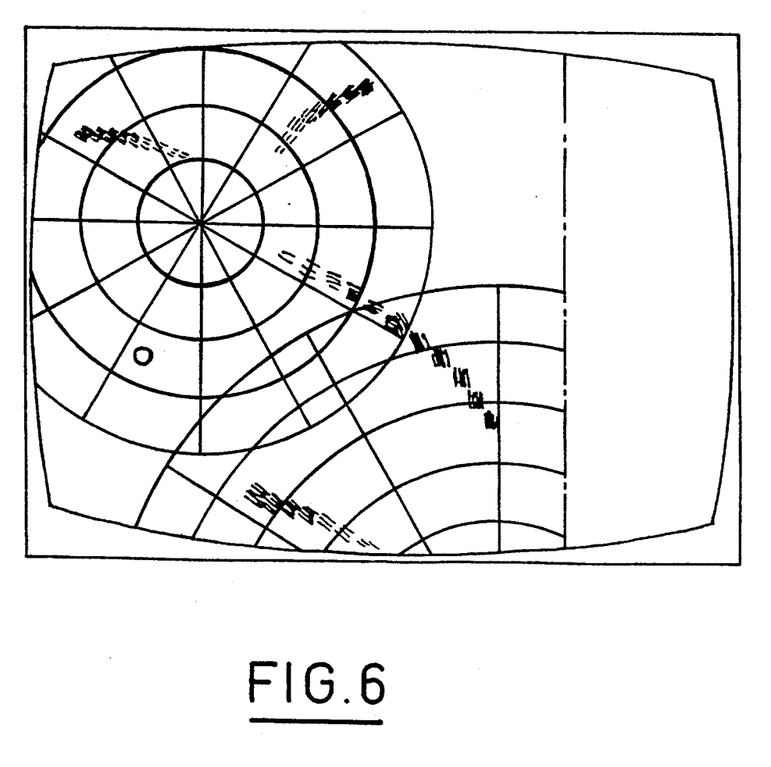
FIG. 6 represents a screen of a monitor on which two radar images are displayed simultaneously.

FIG. 6 gives an example of the simultaneous display of two radar images which permits for example following, without discontinuity, the trajectory of an aircraft, or a missile, which flies in succession in the fields of the two radars.

It is possible to envisage the simultaneous display of four radar images with the aid of a single videographic memory.

What is claimed is:

1. A system for remote display of radar output data on a remote television display assembly unit comprising a television monitor associated with a videographic memory, said data containing at least one videographic signal and scanning data, said system comprising in combination:

pre-processing means for processing different radar output data in real time, said pre-processing means receiving additional input from an analog test pattern generator, said pre-processing means being connected to a thresholding circuit means;

said thresholding circuit means being adapted to partially or completely threshold background noise of said videographic signal received at its input, said thresholding circuit means being connected to a digitizer circuit means;

said digitizer circuit means, digitizing said videographic signal after thresholding, being connected to space-time compression means effecting space-time compression of said digitized videographic signal, containing real time data and background noise, said space-time compression being connected to FIFO memory means;

said FIFO memory means, storing in real time said digitized compression videographic signal, being connected to transmission means;

said transmission means, transmitting in real time in a proprietary serial format said scanning data and compressed videographic signal to said remote television display assembly unit;

said remote television display assembly unit comprising transmission receiver means for receiving data from said transmission means, said remote television display assembly unit including a real time videographic decompression circuit means for decompressing said compressed videographic signal, said videographic decompression circuit means being connected to converter means;

said converter means for converting said videographic signal data entered in polar coordinates into cartesian coordinates, said conversion performed with the aid of compression and scanning data; said converter means being connected to control means;

said control means controlling the content of said videographic memory associated with said television monitor display to control said videographic memory as a function of videographic signal and scanning data, permitting display of a complete image of said radar data;

said control means being connected to after glow processor means;

said after glow processor means controlling certain zones of said videographic memory in accordance with a mathematical treatment formula, writing to said videographic memory, through multiplexer means disposed therebetween; said multiplexer means further receiving data from radar input for display in real time of a complete radar image with a determined background noise level.

2. A system according to claim 1, wherein said pre-processing means is adapted to process scanning data comprising, synchronization, passing through North and increment radar data.

3. A system according to claim 1, wherein said space-time compression circuit means compresses data in respect of spatial merging parameter (M) and time merging parameter (N) for storage in FIFO memory prior to transmission.

4. A system according to claim 1, wherein said transmitting means comprise HF microwave means for transmissin of complete background noise and receiving means.

5. A system according to claim 1, wherein said transmission means comprises FIFO type memory and a real time proprietary digital serial data format transmitter.

6. A system according to claim 1, wherein said transmission means permits partial transmission of the background noise through a wire connection.

7. A system according to claim 1, wherein said transmission means permits complete transmission of the background noise through said wire connection.

8. A system according to claim 1, wherein said transmission means comprise HF microwave means for transmission of partial background noise and receiving means.

9. A system according to claim 1, wherein said control means for controlling the contents of said videographic memory comprise said after glow processor means for processing the contents of certain zones of said videographic memory in accordance with a mathematical treatment formula, so as to produce a phenomenon of pseudo-after glow of certain points of the radar image displayed on said television monitor screen.

* * * * *